Dec. 5, 1939.          T. COHEN          2,182,582
ANTISOIL PROTECTOR FOR MEN'S COLLARS
Filed Aug. 19, 1938
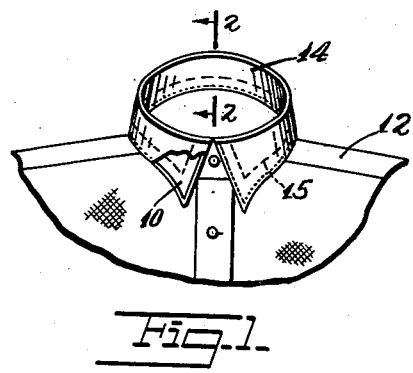
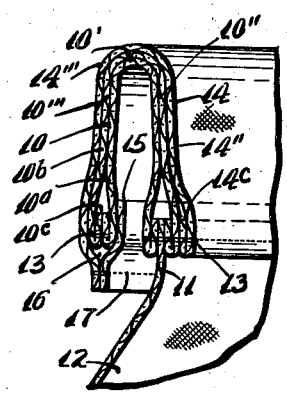
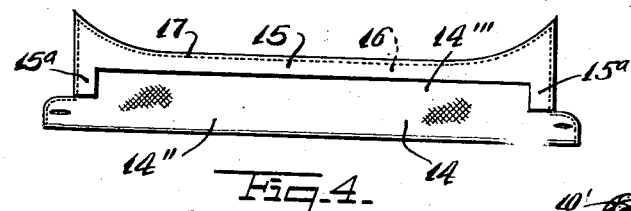
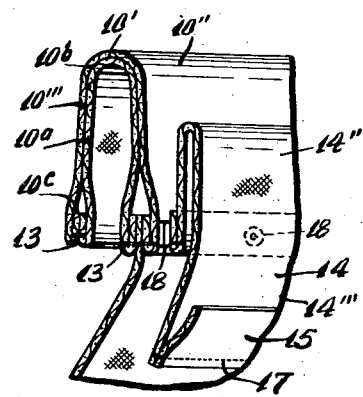
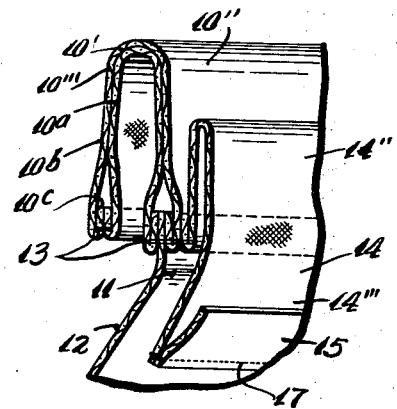
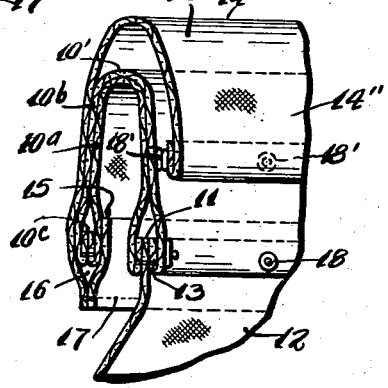
INVENTOR
Theodore Cohen
BY
ATTORNEY Patented Dec. 5, 1939

2,182,582

UNITED STATES PATENT OFFICE 2,182,582

ANTISOIL PROTECTOR FOR MEN'S COLLARS

Theodore Cohen, Bronx, N. Y.

Application August 19, 1938, Serial No. 225,671

2 Claims. (Cl. 2—60)

This invention relates to new and useful improvements in a double collar for men's shirts.

The invention has for an object the construction of a double collar which is characterized by a standard double ply collar for attachment on the collar band of a shirt, and an auxiliary collar, preferably of a single ply, adapted to normally engage over and encase said standard double ply collar. It is proposed to so arrange the parts that first the auxiliary collar is exposed in use, and thereafter when required, the auxiliary collar may be bent inwards, or removed, to expose the standard collar for use.

Still further the invention proposes to provide the auxiliary collar with a strip of material attached along its inner face of the outer portion thereof to form a pocket for receiving the points and the bottom edge of the standard collar in a particular manner.

Still further the invention proposes an arrangement by which the auxiliary collar may be adjusted to several positions to vary the folded junction between the bent portion and the outer portion thereof.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a double collar constructed according to this invention and shown applied upon a shirt.

Fig. 2 is a fragmentary enlarged sectional view taken on the line 2—2 of Fig. 1.

Fig. 3 is a view similar to Fig. 2 but illustrating the auxiliary collar bent downwards.

Fig. 4 is a developed view of the auxiliary collar, per se.

Fig. 5 is a sectional view similar to Fig. 3 but illustrating a modification of this invention.

Fig. 6 is a sectional view similar to Fig. 2 but illustrating another embodiment of the invention.

The double collar for men's shirts, according to this invention, includes a standard double ply collar 10 for attachment on the collar band 11 of a shirt 12. This double ply collar is formed from layers of material 10a and 10b which have their edge portions bent inwards forming small flanges 10c and which are sewed together with stitches 13. The shape of this double ply collar may be that of any standard collar or of special design. The collar 10 is attached along the shirt band 11 by having the top edge portion of the shirt band engaged in between the lower edges 10a and 10b. When the collar is used it is bent along a central area 10' forming an inner band portion 10" and an outer portion 10'''.

An auxiliary collar 14, preferably of a single layer of material, is attached over the standard collar 10. This auxiliary collar 14 has a band portion 14" extending over the band portion of 10 the standard collar and an outer portion 14''' extending over the outer portion of the standard collar. The lower edge of the bent portion 14" is bent inwards forming a flange 14c. The stitches 13 which are used to attach the standard collar 10 to the shirt band 11 are also used to attach the auxiliary collar 14 at its bottom edge to the shirt band 11. A strip of material 15 is attached along the inner face of the outer portion 14''' of the auxiliary collar 14 forming a pocket 16 for receiving certain edges of the standard collar 10.

More specifically, this pocket 16 is adapted to receive the points and the bottom edge of the standard collar 10. The strip of material 15 is secured in position by a line of stitches 17 extended along its edges. At the ends, the strip 15 is provided with laterally extending portions 15a which are adapted to extend along the adjacent edges of the points of the standard collar 10.

In Figs. 1 and 2 the double collar, according to this invention, is shown as it would appear when being worn. When the auxiliary collar 14 becomes soiled the soiled portion 14''' thereof may be disengaged from the front portion 10''' of the standard collar and bent inwards as shown in Fig. 3. In this latter position the auxiliary collar is tucked within the top portion of the shirt. When thus worn the standard collar is exposed for use. It is generally known that the collars of shirts become soiled first. With this construction a shirt may retain its freshness for a longer period.

In Fig. 5 a modified form of the invention has been disclosed which distinguishes from the prior form merely in the fact that the auxiliary collar 14 is removably attached upon the standard collar. Coacting snap fastener elements 18 are arranged along the adjacent faces of the bent portions of the auxiliary and standard collar and when connected, normally serve to hold the bent portion of the auxiliary collar in position. If desired, the auxiliary collar may be bent backwards in a manner very similar to the use explained with reference to Fig. 3. If desired, the auxiliary collar may be completely removed from the shirt by disconnecting the fastening elements 18. In other respects this form of the invention is similar to the previous form and similar parts may be identified by corresponding reference numerals.

In Fig. 6 a still further embodiment of the invention has been disclosed which distinguishes from the form shown in Fig. 5 in the fact that an auxiliary line of fastening elements 18' are provided in addition to the first mentioned line 18. The arrangement is such that the auxiliary collar may therefore be engaged upon the standard collar in several positions. These positions are determined by the position of the bottom edge of the band portion 14" of the auxiliary collar.

As shown in Fig. 6 the bottom edge is engaged upon the fastening elements 18' at a higher elevation than the fastening elements 18. With this arrangement the auxiliary collar 14 will have its bend 14' at a different location than previously. A collar first becomes soiled at the top edge. With this arrangement it is possible to adjust the collar for changing the material at this top edge. This aids in prolonging the life of the collar.

In other respects this form of the invention is similar to the previous form and similar parts may be identified by corresponding reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An adjustable double collar for men's shirts comprising, in combination, a main collar, said main collar including a neck band portion, and a flap portion, and a detachable auxiliary collar, said auxiliary collar including a neck band portion, a flap portion, with a fold line therebetween providing a top edge, the lower free edge of the flap portion of said auxiliary collar having an inwardly turned flange running therealong for engaging over the lower free edge of the flap portion of said main collar, the lower free edge of the neck band portion of said auxiliary collar having a plurality of separable fastening elements therealong, and a plurality of horizontally disposed vertically spaced rows of complementary separable fastening elements secured along the inner face of the neck band portion of said main collar whereby the location of the fold line of the auxiliary collar may be selectively varied in accordance with the height on the main collar of the row of complementary fastening elements selected for engagement with the fasteners on the auxiliary collar.

2. An adjustable double collar for men's shirts comprising, in combination, a main collar, said main collar including a neck band portion, and a flap portion, and a detachable auxiliary collar, said auxiliary collar including a neck band portion, a flap portion, with a fold line therebetween providing a top edge, means for detachably securing the lower free edge of the flap portion of said auxiliary collar to the lower free edge of the main collar, the lower free edge of the neck band portion of said auxiliary collar having a plurality of separable fastening elements therealong, and a plurality of horizontally disposed vertically spaced rows of complementary separable fastening elements secured along the inner face of the neck band portion of said main collar whereby the location of the fold line of the auxiliary collar may be selectively varied in accordance with the height on the main collar of the row of complementary fastening elements selected for engagement with the fasteners on the auxiliary collar.

THEODORE COHEN.